United States Patent
Fueslein

[15] 3,640,346
[45] Feb. 8, 1972

[54] DOUBLE-ACTING DEPTH STOP
[72] Inventor: Jerome L. Fueslein, Linden, Calif.
[73] Assignee: International Harvester Company, Chicago, Ill.
[22] Filed: Dec. 29, 1969
[21] Appl. No.: 888,685

[52] U.S. Cl............................172/318, 172/413, 172/414
[51] Int. Cl.................A01b 63/14, A01b 63/22, A01b 63/16
[58] Field of Search.................172/415, 395, 407, 466, 485, 172/501, 414, 321, 322, 383; 280/43.19, 43.23; 172/318

[56] References Cited

UNITED STATES PATENTS 2,351,830    6/1944    Mitchell et al.........................172/318

*Primary Examiner*—Robert E. Bagwill
*Assistant Examiner*—Stephen C. Pellegrino
*Attorney*—Noel G. Artman

[57] ABSTRACT

An implement having a scraping or leveling blade is provided with end wheels carried on arms mounted on a rockshaft in trailing relation behind the blade when used for scraping, the wheels being optionally disposable at the sides of the blade with the arms extending forwardly when the blade is used in forming dams and the like for irrigation purposes. Power transmission means for rocking the shaft is effective in either position of the wheels to rock the shaft, raise the blade, and return it to a predetermined operating position.

3 Claims, 4 Drawing Figures

PATENTED FEB 8 1972
3,640,346
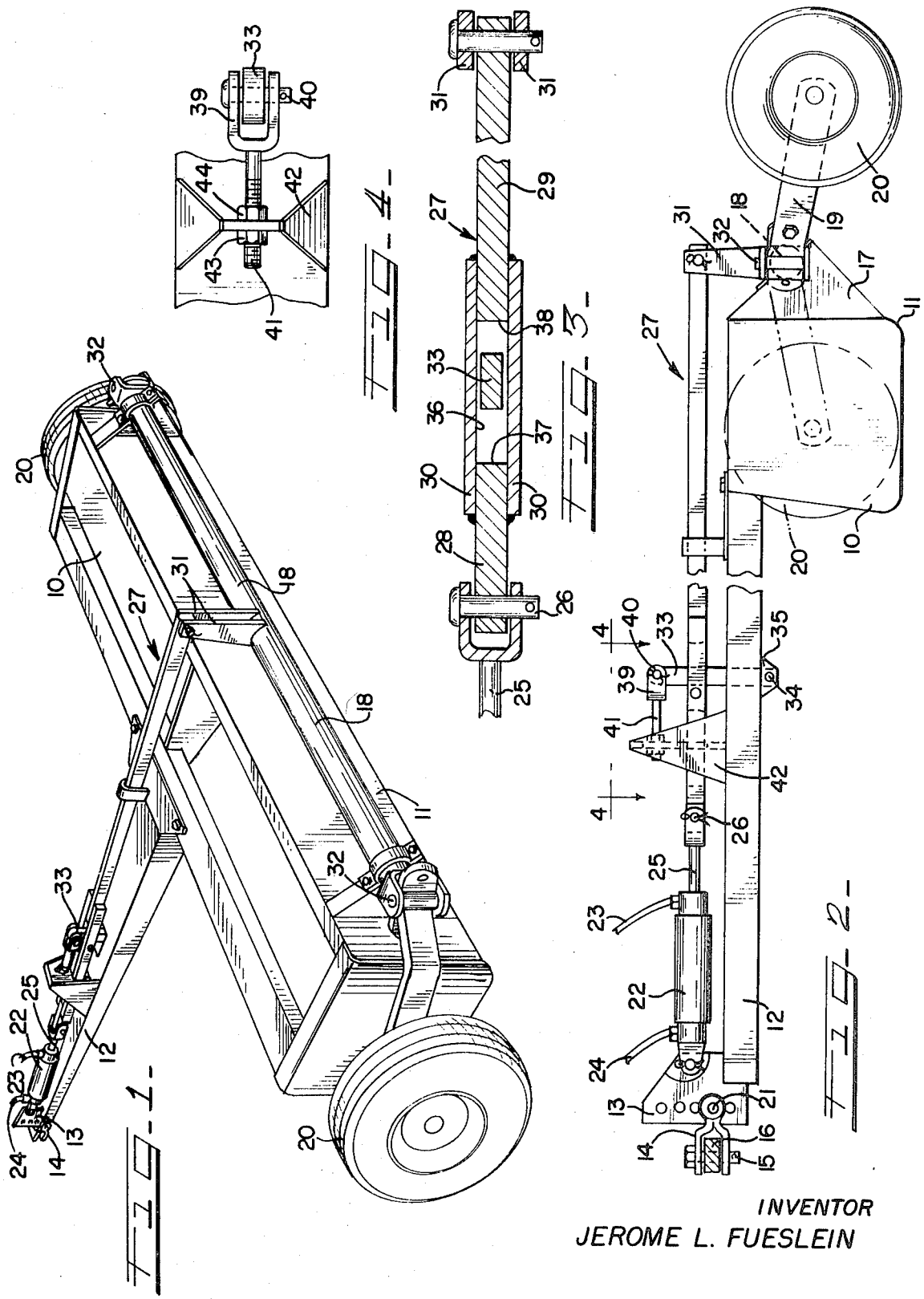
INVENTOR
JEROME L. FUESLEIN

DOUBLE-ACTING DEPTH STOP

BACKGROUND OF THE INVENTION

This invention relates to earthworking implements and particularly to earth movers. More specifically, the invention concerns a scraper or leveling implement. Land levelers and the like are utilized to remove elevations and to fill depressions, and when so used the wheel-carrying arms supporting the implement extend rearwardly in trailing relation within the lateral confines of the blade and the wheels roll on ground which has just been leveled. It is desirable that the blade be useable for other purposes such as irrigation where the blade forms a trench or deposits dirt to form a dam, and in such case it is desired that the wheels run at the ends of the blade and not over the dam formed by the blade. The wheels are then swung outwardly and forwardly in a manner similar to that described and shown in Hipple U.S. Pat. No. 2,581,533, to run on ground not engaged by the blade. However, a disadvantage in prior devices of this type has been the failure to provide satisfactory means for raising the blade in either position of the wheels and to return it to a predetermined and adjustable operating position. Therefore, an object of this invention is the provision of an improved implement of the scraper or leveler type which is convertible for use in the formation of trenches and dams in irrigation operations.

Another object of the invention is the provision of two-way adjustable stop means whereby in either use of the implement the scraper blade can be raised and lowered to a preset depth of operation.

DESCRIPTION OF THE DRAWINGS

FIG. 1 is a perspective view of an earth moving implement embodying the double-acting depth stop mechanism of this invention;

FIG. 2 is a diagrammatic side elevation of the structure shown in FIG. 1;

FIG. 3 is an enlarged sectional view of a portion of the depth adjusting mechanism of FIG. 2; and FIG. 4 is an enlarged detail in plan of a portion of the structure shown in FIG. 2.

DESCRIPTION OF THE PREFERRED EMBODIMENTS

The implement shown in the drawings is an earthmover comprising an elongated transversely extending earth-receiving bowl 10 of conventional construction having a scraper blade 11 and a forwardly projecting hitch structure 12 to the forward end of which is affixed a plate 13 having a pivotal connection with a clevis 14 carrying a hitch pin 15 by which the implement is connected to the drawbar 16 of a tractor (not shown).

To the rear end of the bowl 10 are affixed laterally spaced brackets 17 to rotatably receive an axle or shaft structure 18 which, for the purposes of this ivention, may be considered to be of conventional construction and having affixed thereto laterally spaced wheel carriers 19 upon which are mounted supporting wheels 20.

The implement is vertically moved about the axis of a pivot pin 21 connecting the hitch structure 12 to clevis 14, between operating and transport positions, and to adjust the depth of operation of the scraper by swinging the wheel carriers 19 about the axis of shaft structure 18. This is accomplished by the provision of power transmission means in the form of a hydraulic cylinder 22 supplied with fluid under pressure through hose lines 23 and 24 from a suitable source on the tractor. A piston rod 25 slidable in the cylinder is pivotally connected by a pin 26 to one end of a connector link 27 comprising longitudinally spaced elements 28 and 29 connected by straps 30 affixed to the respective link elements as by welding, as clearly shown in FIG. 3.

The rear end of connector link 27 is received between a pair of rock arms 31 affixed to shaft 18 between its ends, and pivotally connected to the upper ends thereof. Thus, in the solid line position of wheels 20 and carriers 19 shown in FIG. 2, the extension stroke of piston rod 25 rocks shaft 18 clockwise, swinging wheel carriers 19 downwardly to raise the implement about the axis of pin 21, and conversely, the retraction stroke of the piston rod swings the wheel carriers 19 upwardly to lower bowl 10.

As pointed out before, when implement functions as a leveler the wheel carriers extend rearwardly and the wheels 20 ride upon ground previously engaged by the scraper blade. When the implement is to be used for irrigation purposes the wheel carriers 19, which are mounted upon the draft structure 18 by vertical spindles 32, are swung outwardly and forwardly to the dotted line position of FIG. 2 with the wheels disposed laterally outwardly of the bowl ends and may be held in that position by any suitable means.

In the dotted line position of the wheel carriers 19 and wheels 20 the extension stroke of piston rod 25 swings the wheels upwardly, lowering the scraper bowl, and conversely, the retraction stroke of the piston rod rocks shaft 18 counterclockwise, swinging the wheels downwardly and raising the implement.

Cylinder 22 and rod 25 with connector link 27 form with a stop bar 33 a depth adjusting means by which the stroke of piston rod 25 is limited in either the solid line or the dotted line position of the wheels in FIG. 1, to assure return of the implement from its transport position to a selected constant operating depth. Stop bar 33 is receivable in an opening provided in the implement hitch and mounted at the lower end on a pivot pin 34 carried by lugs 35 affixed to hitch structure 12 and the upper portion of the bar is slidably receivable and an elongated slot 36 formed by the straps 30 and the spaced ends 37 and 38 of connector link elements 28 and 29, respectively.

Stop bar 33 is oscillatable about pivot 34 but is held in a selected fixed position by the provision of a clevis bolt 39 pivoted on a pin 40 at the upper end of stop bar 33. The threaded shank 41 of clevis bolt 39 is slidably receivable in an opening provided in a bracket 42 affixed to hitch structure 12. Stop bar 33 is adjusted to a selected position by loosening a pair of nuts 43 and 44, advancing or retracting clevis bolt 39 and again tightening the nuts 43 and 44.

The ends 37 and 38 of link elements 28 and 29 form abutments engageable with stop bar 33 in response to extension and retraction strokes, respectively, of piston rod 25. Adjustment of the position of stop bar 33 varies the stroke of cylinder rod 25 required to engage the stop bar 33 with one of the said abutments and limits the extent to which the implement can be lowered and thus regulates its depth of operation, irrespective of whether the wheels 20 are in the solid line or dotted line position of FIG. 1. For example, with the wheels in the scraping or solid line position of FIG. 1, lowering of the bowl 10 to its operating position from a raised position is accomplished by the retraction stroke of piston rod 25. The rod is retracted until abutment 38 engages stop bar 33 in its preselected position. Conversely, if the wheels 20 are in the irrigation or dotted line position the piston rod is extended until abutment 37 engages stop bar 33 to raise the wheels and lower the bowl.

What is claimed is:

1. In an implement having a traveling support, a shaft member mounted on the support on an axis transverse to the direction of travel and a wheel carrier including ground-engaging wheels mounted on the shaft member for swinging in a vertical plane relative to the support, upon rocking the shaft member, to raise the support to a transport position and to return it to a selected operating position wherein said wheel carrier is optionally shiftable longitudinally between positions forwardly of and rearwardly of the axis of said shaft member to adapt the implement for the performance of different functions, the combination of power-operated means on the support operatively connected to said shaft member and having extension and retraction strokes for rocking the latter in opposite directions to vertically move the support in either of said positions of the wheel carrier, one of said strokes, being effective in one of said positions of the wheel carrier to raise the support and in the other of said positions to lower the support, and adjusting means associated with said power operated means to selectively limit the extension stroke thereof in one of said positions of the wheel carrier and to selectively limit the retraction stroke thereof and the other of said positions of the wheel carrier to provide a constant operating position to which the implement is returned from its transport position irrespective of the longitudinal position of said wheel carrier said adjusting means including a stop member mounted on the support for longitudinal movement relative thereto and a connector extending between said power-operated means and said shaft member and having a lost-motion connection with said stop member, adjustable mounting means for mounting said stop member on the support whereby the stop member can be moved and secured at selected fixed positions relative to the support and operatively engageable with said connector after a predetermined extension stroke of said power-operated means in one of the positions of said wheel carrier and after a predetermined retraction stroke of the power-operated means in the other position of said wheel carrier;

2. The invention set forth in claim 1, wherein said connector has a slot therein to receive the stop member, the ends of said slot engageable with the stop member on extension and retraction strokes of the power-operated member.

3. The invention set forth in claim 2, wherein said adjusting means includes a stationary member on the support and a member adjustable in length connecting said stationary member to the stop member to move the latch to selected positions on the support and vary the stroke of the power-operated means.

* * * * *